(12) United States Patent
Taylor et al.

(10) Patent No.: US 9,122,988 B2
(45) Date of Patent: Sep. 1, 2015

(54) ONTOLOGY-DRIVEN COMPLEX EVENT PROCESSING

(75) Inventors: Kerry Lea Taylor, Acton (AU); Lucas Leidinger, Eppelborn (DE)

(73) Assignee: Commonwealth Scientific and Industrial Research Organisation, Campbell, Australian Capital Territory (AU)

( * ) Notice: Subject to any disclaimer, the term of this patent is extended or adjusted under 35 U.S.C. 154(b) by 320 days.

(21) Appl. No.: 13/823,997

(22) PCT Filed: Sep. 16, 2011

(86) PCT No.: PCT/AU2011/001197
§ 371 (c)(1),
(2), (4) Date: Jun. 5, 2013

(87) PCT Pub. No.: WO2012/034187
PCT Pub. Date: Mar. 22, 2012

(65) Prior Publication Data
US 2013/0290241 A1    Oct. 31, 2013

(30) Foreign Application Priority Data
Sep. 17, 2010 (AU) .................................. 2010904208

(51) Int. Cl.
G06F 17/00 (2006.01)
G06N 5/02 (2006.01)
(52) U.S. Cl.
CPC ........................................ G06N 5/02 (2013.01)
(58) Field of Classification Search
USPC .......................................................... 706/55
See application file for complete search history.

(56) References Cited

U.S. PATENT DOCUMENTS 8,666,993 B2 * 3/2014 Chunilal ...................... 707/749
8,990,127 B2 * 3/2015 Taylor ............................ 706/12

(Continued)

OTHER PUBLICATIONS

Research on the Ontology-Based Complex Event Processing Engine of RFID Technology for Agricultural Products Zhu Huaji ; Wu Huarui ; Sun Xiang Artificial Intelligence and Computational Intelligence, 2009. AICI '09. International Conference on vol. 1 DOI: 10.1109/AICI.2009.91 Publication Year: 2009 , pp. 328-333.*

(Continued)

*Primary Examiner* — Michael B Holmes
(74) *Attorney, Agent, or Firm* — Brinks Gilson & Lione

(57) ABSTRACT

Described embodiments relate generally to ontology-driven complex event processing (CEP). When implemented as a computer (105), the computer (105) enables, in communication with a network, user generation and transformation of an event definition into an ontology-based event definition. A computer-implemented transformer component (140) receives the ontology-based event definition, generates event processing instructions and transmits the event processing instructions to a CEP server (150) over the network. The CEP server (150) then observes a plurality of structured messages containing event data and determines whether the event data satisfy all conditions of the event definition and sends an event message responsive to determining that all event definition conditions are satisfied. The described techniques allow an arbitrary high-throughput CEP to be used. A user, unaware of the normally difficult and heterogeneous CEP interfaces, can easily construct requests for event alerts using the described interface and a domain ontology that is appropriate for the user's interest.

34 Claims, 17 Drawing Sheets

(56) References Cited

U.S. PATENT DOCUMENTS

2008/0270384 A1 10/2008 Tak
2009/0319501 A1 12/2009 Goldstein et al.

OTHER PUBLICATIONS

Features extraction of tool cutting AE signals based on Hilbert-Huang transformation Chang Che ; Dan Hu Advanced Computer Control (ICACC), 2010 2nd International Conference on vol. 4 DOI: 10.1109/ICACC.2010.5487221 Publication Year: 2010 , pp. 167-171.*

Model-based system engineering using SysML: Deriving executable simulation models with QVT Kapos, G.-D. ; Dalakas, V. ; Tsadimas, A. ; Nikolaidou, M. ; Anagnostopoulos, D. Systems Conference (SysCon), 2014 8th Annual IEEE DOI: 10.1109/SysCon.2014.6819307 Publication Year: 2014 , pp. 531-538.*

Automatic control of workflow processes using ECA rules Joonsoo Bae ; Hyerim Bae ; Suk-Ho Kang ; Yeongho Kim Knowledge and Data Engineering, IEEE Transactions on vol. 16 , Issue: 8 DOI: 10.1109/TKDE.2004.20 Publication Year: 2004 , pp. 1010-1023.*

International Search Report for corresponding International application No. PCT/AU2011/001197, mailed Nov. 24, 2011.

Written Opinion of the International Searching Authority for corresponding International application No. PCT/AU2011/001197, mailed Nov. 24, 2011.

* cited by examiner

Description: ObservationEvent

● Event
  and (consistOf exactly 1 Observations)
  and (doRelease exactly 1 Alert)
  and (usingStrictOrder only boolean)
  ~805

Description: Mail

● Alert
  and (hasDestinationMail exactly 1 string)
  and (hasMessage exactly 1 string)
  and (hasTitle exactly 1 string)
  ~810

Description: SMS

● Alert
  and (not (has Title exactly 1 string))
  and (hasDestinationSMS exactly 1 string)
  and (hasMessage exactly 1 string)
  ~815

Description: SingleObservations

● Observations
  and (belongsTo exactly 1 ObservationEvent )
  and (hasTrigger exactly 1 Trigger)
  and (usesProgram exactly 1 InstrumentProgram)
  and (linkPos exactly 1 integer)
  ~820

Description: ObservationIntersection

● Observations
  and (hasLeftValue exactly 1 Observations )
  and (hasRightvalue exactly 1 Observations)
  and (matchingClauseCmd value "&&")
  and (whereClauseCmd value "AND")
  ~825

Description: ObservationUnion

● Observations
  and (hasLeftValue exactly1 Observations )
  and (hasRightValue exactly 1 Observations)
  and (matchingClauseCmd value "IT")
  and (whereClauseCmd value "OR")
  ~830

Figure 8A

Description: ObservationSequence

● Observations
  and (hasLeftValue exactly 1 Observation)
  and (hasRightValue exactly 1 Observations)
  and (MatchingClauseCmd value ",")     ~835

Description: ObservationGroup

● Observations
  and (Contains min 1 Observations)
  and (belongsTo exactly 1 ObservationEvent)     ~840

Description: CurrentProgram

● (not (asesOperation some Operation))
  and (not (usesPeriod some (Date or TimeUnit)))
  and (usesSensor some (HumiditySensor or TemperatureSensor or Wind
  DirectionSensor or WindSpeedSensor))     ~845

Description: About

● Trigger
  and (trigCmd value "column > (value1*0.9) AND column < (value1*L1)"@)
  and (hasValue1 exactly 1 int)     ~850

Description: Area

● Trigger
  and (trigCmd value "column > value1 AND column < value2" )
  and (hasValue1 exactly 1 int)
  and (hasValue2 exactly 1 int)     ~855

Description: Change

● Trigger
  and (trigCmd value "instrumentcolumn!= (SELECT AVG(instrumentcolumn)
  FROM instrument KEEP 2 ROWS)")     ~860

Description: decrease

● Trigger
  and (trigCmd value "instrumentcolumn < (SELECT AVG(instrumentcolumn)
  FROM instrument KEEP 2 ROWS)")     ~865

Figure 8B

| Description: Equal | ⬜⬜◯✕ |
|---|---|
| ● Trigger<br>  and (trigCmd value "column = value1")<br>  and (hasValue1 exactly 1 int) | ~870 |

| Description: Greater | ⬜⬜◯✕ |
|---|---|
| ● Trigger<br>  and (trigCmd value "column > value1")<br>  and (hasValue1 exactly 1 int) | ~875 |

| Description: Increase | ⬜⬜◯✕ |
|---|---|
| ● Trigger<br>  and (trigCmd value "instrumentcolumn > (SELECT AVG(instrumentcolumn) FROM instrument KEEP 2 ROWS)") | ~880 |

| Description: Less | ⬜⬜◯✕ |
|---|---|
| ● Trigger<br>  and (trigCmd value "column < value1")<br>  and (hasValue1 exactly 1 int) | ~885 |

| Description: Received | ⬜⬜◯✕ |
|---|---|
| ● Trigger<br>  and (trigCmd value "column = column") | ~890 |

Figure 8C

```
CREATE INPUT STREAM WM16XXInd_3_input
SCHEMA (WS_TemperatureSensor_3. FLOAT, WS_HumiditySensor_4 FLOAT);
CREATE INPUT STREAM WM1600Ind_4_input
SCHEMA (WS_TemperatureSensor_6 FLOAT, WS_WindSpeedSensor_7 FLOAT);
CREATE OUTPUT STREAM FilteredOutstream
SCHEMA (
WM16XXInd_3_input_WS_TemperatureSensor_3_0 FLOAT,
WM1600Ind_4_input_WS_Temperaturesensor_6_1 FLOAT,
WM16XXInd_3_input_WS_HumiditySensor_4_2 FLOAT,
WM1600Ind_4_input_WS_WindSpeedSensor_7_3 FLOAT);
CREATE WINDOW WM16XXInd_3_input_WS_TemperatureSensor_3_0_WINDOW
SCHEMA (WS_TemperatureSensor_3_0_FLOAT)
KEEP LAST ROW;
INSERT INTO WM16XXInd_3_input_WS_TemperatureSensor_3_0_WINDOW
SELECT WS_TemperatureSensor_3
FROM WM16XXInd_3_input
WHERE (WM16XXInd_3_input.WS_TemperatureSensor_3>-20 AND
WM16XXInd_3_input.WS_TemperatureSensor_3<-10);
CREATE WINDOW WM1600Ind_4_input_WS_TemperatureSensor_6_1_WINDOW
SCHEMA (WS_TemperatureSensor_6_1_FLOAT)
KEEP LAST ROW;
INSERT INTO WM1600Ind_4_input_WS_TemperatureSensor_6_1_WINDOW
SELECT WS_TemperatureSensor_6
FROM WM1600Ind_4_input
WHERE (WM1600Ind_4_input.WS_TemperatureSensor_6>-20 AND
WM1600Ind_4_input.WS_TemperatureSensor_6<-10);
CREATE WINDOW WM16XXInd_3_input_WS_HumiditySensor_4_2_WINDOW
SCHEMA (WS_HumiditySensor_4_2_FLOAT)
KEEP LAST ROW;
INSERT INTO WM16XXInd_3_input_WS_HumiditySensor_4_2_WINDOW
SELECT WS_HumiditySensor_4
FROM WM16XXInd_3_input
WHERE WM16XXInd_3_input.WS_HumiditySensor_4<35;
CREATE WINDOW WM1600Ind_4_input_WS_WindspeedSensor_7_3_WINDOW
SCHEMA (WS_WindSpeedSensor_7_3_FLOAT)
KEEP LAST ROW;
INSERT INTO WM1600Ind_4_input_WS_WindSpeedSensor_7_3_WINDOW
SELECT WS_WindSpeedSensor_7
FROM WM1600Ind_4_input
WHERE WM1600Ind_4_input.WS_WindSpeedSensor_7>120;
INSERT INTO FilteredOutstream
SELECT*
FROM
WM16XXInd_3_input_WS_TemperatureSensor_3_0 WINDOW,
WM1600Ind_4_input_WS_TemperatureSensor_6_1 WINDOW,
WM16XXInd_3_input_WS_HumiditySensor_4_2 WINDOW,
WM1600Ind_4_input_WS_WindSpeedSensor_7_3 WINDOW
MATCHING [
3600 SECONDS;
WM16XXInd_3_input_WS_TemperatureSensor_3_0 WINDOW ||
WM1600Ind_4_input_WS_TemperatureSensor_6_1 WINDOW),
WM16XXInd_3_input_WS_HumiditySensor_4_2 WINDOW,
WM1600Ind_4_input_WS_WindSpeedSensor_7_3 WINDOW];
```

Figure 9

# ONTOLOGY-DRIVEN COMPLEX EVENT PROCESSING

CROSS-REFERENCE TO RELATED APPLICATIONS

The present application is the U.S. National Stage application of PCT International Application No. PCT/AU2011/001197, filed on Sep. 16, 2011, which claims priority to Australian Patent Application No. 2010904208, filed on Sep. 17, 2010, the content of which is incorporated by reference.

TECHNICAL FIELD

Described embodiments relate generally to ontology-driven complex event processing systems and methods and computer program instructions stored or otherwise embodied in computer readable storage for implementing such systems and methods.

BACKGROUND

Complex events are events that only happen if a number of other events happen. In this way, complex events can be understood as events that summarise, represent or denote a set of other events.

Complex event processing (CEP) involves the computerised performance of operations on complex events and may be defined as a set of techniques and tools for analysing a complex series of interrelated events.

A complex event may be made up of a series of other events, possibly occurring within a certain temporal proximity, and possibly including one or more other complex events.

A wedding is an example of a complex event, comprising a combination of simple events, such as a man appearing in a tuxedo, a woman appearing in a white gown, rice or confetti being thrown into the air and church bells ringing.

Some CEP software packages are currently commercially available. However, there is no portable standard for specification of complex events and the available CEP packages are difficult to understand and use. Such CEP software packages have heterogeneous interface requirements that require significant effort on the part of software developers to integrate such CEP packages within a larger system.

It is desired to address or ameliorate one or more shortcomings or disadvantages associated with existing systems or methods that employ complex event processing, or to at least to provide a useful alternative thereto.

SUMMARY

Some embodiments relate to a system for ontology-driven complex event processing (CEP), comprising:
 a computer in communication with a network, the computer having access to program code executable to enable user generation of an event definition comprising at least one condition and to transform the event definition into an ontology-based event definition; and
 a computer-implemented transformer component to receive the ontology-based event definition, generate event processing instructions based on the ontology-based event definition and transmit the event processing instructions to a CEP server over the network, wherein the event processing instructions are executable by the CEP server to configure the CEP server to:

observe a plurality of structured messages containing event data from at least one data source and to determine whether the event data satisfy all conditions of the event definition, and
 send an event message to an entity specified in the event definition responsive to determining that all event definition conditions are satisfied.

The transformer component may be in communication with the computer over the network. Alternatively, the transformer component may be executed by the computer. The system may further comprise the CEP server when configured according to the event processing instructions.

The transformer component may be configured to communicate with a semantic reasoner to classify generated event processing instructions.

The program code may comprise code to execute an ontology editor application and the ontology editor application may have access to a stored event ontology to support user generation of the event definition. The program code may comprise code to execute a user interface component in cooperation with the ontology editor application to allow user selection of the entity, the at least one condition and the content of the event message when generating the event definition.

The user interface component may include code to display each condition as a discrete configurable user interface element. The user interface component may include code to allow combination of multiple conditions as a concatenation of user interface elements. The user interface element may allow selection of a logical combination operator to be applied to at least one other concatenated user interface element. The user interface element may allow a temporal combination operator (such as using strict order within a matching time period, or co-occurring within a time interval) to be applied to at least one other concatenated user interface element. The user interface component may be configured to allow selection of a single data source for each condition, the selection being from among a plurality of data sources.

The user interface component may be configured to allow user selection of a time window for the satisfaction of the conditions as part of the event definition.

At least one of the ontology editor application and the user interface component may be configured to create a set of ontology instances in the event ontology that correspond to the event definition.

Each condition may include an event trigger selected from among a plurality of triggers.

The at least one data source may comprise a plurality of different types of data sources.

Some embodiments relate to a method of ontology-driven complex event processing (CEP), comprising:
 receiving via a computer interface an event definition of a complex event, the computer interface executing on a computer and the event definition comprising at least one condition;
 accessing a stored event ontology accessible to the computer;
 transforming the event definition into an ontology-based event definition based on the event ontology;
 receiving at a computer-implemented transformer component the ontology-based event definition;
 generating by the transformer component event processing instructions based on the ontology-based event definition; and transmitting the event processing instructions to a CEP server over a network, wherein the event processing instructions are executable by the CEP server to configure the CEP server to:
observe a plurality of structured messages containing event data from at least one data source and to determine whether the event data satisfy all conditions of the event definition, and
send an event message to an entity specified in the event definition responsive to determining that all event definition conditions are satisfied.

The event definition may be received by a user interface component cooperating with an ontology editor application, both of which are executed by the computer, the user interface component allowing user selection of the entity, the at least one condition and the content of the event message when receiving the event definition. The user interface component may display each condition as a discrete configurable user interface element. The user interface component may allow combination of multiple conditions as a concatenation of user interface elements. The user interface component may allow selection of a logical combination operator to be applied to at least one other concatenated user interface element. The user interface component may allow selection of a temporal combination operator (such as using a strict order within a matching time period or co-occurring within a time interval to be applied to at least one other concatenated user interface element.

The user interface component may allow selection of a single data source for each condition from among a plurality of data sources.

Some embodiments relate to computer-readable storage storing executable program code to perform the described methods and/or implement the described systems.

BRIEF DESCRIPTION OF THE DRAWINGS

Embodiments are described in further detail below, with reference to the accompanying drawings, and by way of example. In the drawings:

FIGS. 8A, 8B and 8C illustrate example ontology-based event definition elements;

FIG. 9 illustrates example CEP configuration instructions generated according to an example event definition depicted by the example display illustrated in FIGS. 6A and 6B;

DETAILED DESCRIPTION

Figure 1:
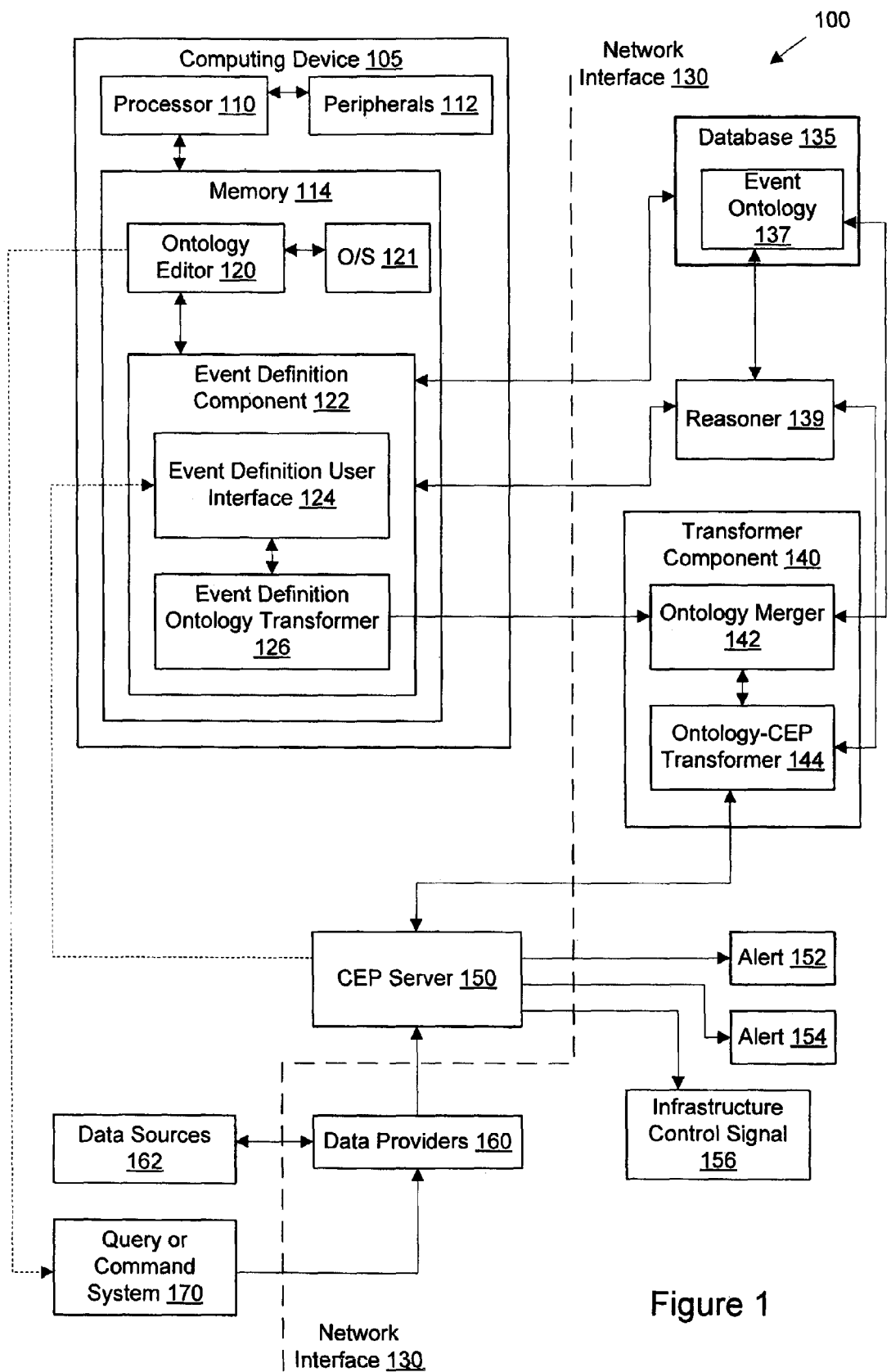
FIG. 1 is a block diagram of a system for ontology-driven complex event processing.

Described embodiments relate generally to ontology-driven complex event processing (CEP) systems and methods and computer program instructions embodied on computer readable media for implementing such systems and methods.

The system components described herein are generally comprised of computer-executable code modules. However, such components may include or interact with some hardware components or elements to achieve the described functionality. In fact, all described software functionality, including the execution of the program code to achieve the described functionality, is necessarily executed by the underlying computer hardware. Thus, while the terms "component", "transformer", "interface", "reasoner", "editor" and "merger" used herein nominally refer to software applications and/or code modules, it should be understood that such terms connote an underlying set of machine processes executed by computer hardware/architecture within a computing device.

Described embodiments involve the use of ontologies in specifying and recognising complex events that arise as selections and correlations (including temporal correlations) of structured digital messages. Semantic event recognition based on unstructured messages is not contemplated here because unstructured messages would generally not be parseable by the CEP server.

Described embodiments use ontologies as a basis for the definition of contextualised complex events of interest and translate the definition to selections and combinations of messages and data transmitted from one or more contextualised data sources, such as sensor networks, financial market data, supply chain management, security systems and fraud monitoring, manufacturing operations or other external data sources.

Described embodiments comprise some event definition software (built as a plug-in to Protégé 4) and a transformer component that interfaces with a commercial CEP software package executing on a computer (i.e. a CEP server). The interface uses a domain-dependent OWL 2 ontology of sensed or monitored phenomena and events to permit the user to define new (complex) events as selections and compositions of the initial events, with the ontology providing context for the events. Supported by description logic formal reasoning to classify and validate the event definition, the new event definitions are translated to event processing instructions in the native language of the CEP software to configure the CEP server to watch for events satisfying the event definitions and the event definitions, in the form of event processing instructions, are then executed under the control of the CEP.

The described techniques allow an arbitrary high-throughput CEP to be used without burdening the run-time system with contextualisation overhead. A user, unaware of the normally difficult and heterogenous CEP interfaces, can easily construct requests for event alerts using the described interface and a domain ontology that is appropriate for the user's interest, rather than being only implicit and inconsistent within the heterogeneous systems from which the basic messages arise.

Due to the ontology structure, implicit terms (known a priori) to be used within the structured source messages can be stored as instances in the ontology, and retrieved dynamically for the automatic ontology-based event definition translation process. Because a domain ontology in a standard representation language is used, the same ontology may also be used for related purposes (such as being a source of vocabulary for annotation, or for description of sensor devices or other sources). This may improve its usability for description of events due to its familiarity. Because the representation language is a formal, logical language, it can be used in conjunction with available semantic reasoners for discovery and semantic optimisation of event descriptions—increasing both the overall usability and the run-time performance of the system.

Referring in particular to FIG. 1, a system 100 for ontology-driven complex event processing is shown and described in further detail. Reference is also made to FIGS. 2 to 9 and 11 for illustration of features and/or functions of aspects of system 100. Method embodiments are described further below with reference to FIG. 10.

Generally, the system 100 comprises a computing device 105, which may comprise a personal computing device, whether portable or desktop, or may comprise a computer server accessible to a user according to normal client-server architecture. Computing device 105 operates in combination with a merger component 140, which may execute on computing device 105 or may execute on a separate computing device that is in communication with computing device 105 over a network interface 130. Computing device 105 and merger component 140 both have access over the network interface 130 or in local storage to an event ontology 137 stored in a file stored on a file system 135 (such as a database or ontology repository, for example) in the OWL 2 normative format. Additionally, both computing device 105 and transformer component 140 have access to a semantic reasoner 139, either locally or over the network interface 130.

Transformer component 140 communicates with a CEP server 150 over the network interface 130 in order to provide event processing instructions to CEP server 150 according to a user-selected event definition. Such event processing instructions cause CEP server 150, in executing those instructions, to configure itself to observe and process incoming structured messages to determine whether the specified complex event has occurred and, if so, to transmit one or more alerts 152, 154 or control signals 156 to an external destination specified in the event processing instructions (and the original event definition).

The structured messages received via CEP server 150, and processed in determining the occurrence of complex events, may be received from one or more data providers 160 over the network interface 130, and those data providers 160 may format and transmit those structured messages based on raw structured or unstructured data received from one or more data sources 162. Data providers 160 may thus act as intermediary data processing nodes where needed, for example where the data sources 162 are too dumb to format their output data as structured messages or lack the ability to communicate directly with CEP server 150.

An external or integrated query or command system 170 (described in further detail below) may be used to generate queries or commands to the data providers 160, which communicate with the data sources 162 to cause data sources 162 to transmit certain data streams for processing by CEP server 150.

In embodiments where data sources 162 are sufficiently sophisticated to receive a configuring query or command directly from the query or command system 170 and to communicate directly with CEP server 150, data providers 160 may not be needed.

Computing device 105 comprises at least processor 110 and memory 114. Memory 114 may be local or distributed and may include a combination of volatile and non-volatile storage. Processor 110 may communicate with normal computer peripherals 112 comprised in the computing device 105, in order to effect computer user interface functions and communication functions in a normal way.

Memory 114 stores computer program code accessible to the at least one processor to execute an ontology editor application 120 and an event definition component 122. Additionally, memory 114 may store other program code, such as code to execute an operating system 121 and other normal computer functions. Event definition component 122 comprises an event definition user interface 124 and an event definition ontology transformer 126 responsive to the event definition user interface 124 to generate an ontology-based event definition according to received event definition user input. Event definition component 122 communicates with reasoner 139 to populate user interface elements 200 (FIG. 2) with suitable instances and/or classes in the event ontology 137, thereby facilitating receipt of the event definition in a form readily convertible into an ontology-based form.

The CEP server 150 may comprise an existing complex event processing tool. A number of such tools are available as open source or commercially: for example, Esper, StreamBase, or Coral8 (which was used in described implementations). The CEP Server 150 accepts event processing instructions including configuration data that describes, in an Event Processing Language, (EPL), how to read messages from data streams and to look for combinations of messages, possibly with temporal relationships, that signal the occurrence of defined simple or complex events of interest. The event processing instructions include instructions to the CEP server 150 about actions to take when such a defined event occurs. In some embodiments, CEP server 150 may be configured to provide feedback messages to computing device 105 (and event definition user interface 124 in particular) directly or indirectly to indicate whether the event processing instructions could be parsed and/or executed. An example of event processing instructions is shown in FIG. 9 and described in further detail below in the context of a weather station with a sensor network as data provider 160 and/or data sources 162.

The semantic reasoner 139 may be a third party component for interpreting ontologies developed in a formal language, such as the description logic of the W3C Web Ontology Language recommendation (OWL 2). Among other things, a reasoner can compute class subsumption, semantic class equivalence and instance membership of classes. Suitable semantic reasoners include Hermit, Pellet and Fact++. Hermit has been used in described implementations. In combination with transformer component 140, reasoner 139 may form part of a semantic event middleware programmatically interposed between computing device 105 and CEP server 150.

The event ontology 137 may be an OWL2 representation of the domain (event) context and is purpose-built for the user's domain of interest (e.g. local climate conditions, financial data, etc.), the connected sensor systems or other data sources (e.g. a wireless sensor network measuring soil and leaf conditions and the Weather Station) and the CEP server 150 that is used.

In described embodiments where the data sources include a sensor network, classes are identified corresponding to instruments, locations (of instruments), sensors (attached to instruments), observation properties of sensors (e.g. wind speed), triggers (a condition over observational data received from instruments), alerts (the action to be taken when a defined event is recognised), events (the occurrence of defined complex combinations of observations), streams (descriptions of data sources, the observation properties they provide and their frequencies of observation), and primitives derived from the CEP event processing language for composing observations into complex events over multiple streaming data sources.

For embodiments using sensor networks as a data source, the event ontology 137 includes, as instance data, information about the structure and configuration of the connected sensor systems, and also fragments (symbols, keywords, language phrases etc) of the CEP configuration language that can be used for configuring the CEP server. Other application-dependent context classes may be included. An example event ontology 700 for embodiments employing sensor networks as a data source is shown in FIGS. 7, 8A, 8B and 8C. Ontology-based event definition elements 805 to 890 shown in FIGS. 8A to 8C are generated by event definition ontology transformer 126 based on the event definition received (e.g. by user input) via event definition user interface 124. The ontology-based event definition elements 805 to 890 include, by way of example only and without limitation, the following elements.

The class observation event (805) is the general description of events within the ontology. This class defines a complex event as something with an alert, an event definition (observations), and specifies that a temporal order (using strict order) can be defined.

The class email (810) describes an email alert within the ontology, where the email alert has a destination, a message and a title.

The class SMS (815) describes a short message service (SMS) alert within the ontology, where the SMS alert has a destination and a message but no title.

The ontology class singleObservation (820) defines a single event within the entire complex event definition. The singleObservation class has a trigger which specifies data to be filtered, an instrument program to set up for the data source and an identifier for the position of relevant data within the source data stream.

The observationIntersection class (825) is used to describe a conjunction between two single events within the complex event description. The observationIntersection class also contains CEP-specific terms which are used to generate statements for the CEP server 150.

The observationUnion class (830) is used to describe a disjunction between two single events within the complex event description. The observationUnion class also contains CEP-specific terms which are used to generate statements for the CEP server 150.

The observationSequence class (835) is used to describe a temporal dependence between two single events within the complex event description. This class also contains CEP-specific terms which are used to generate statements for the CEP server 150.

The observationGroup class (840) is used to describe all single events within the complex event definition which are grouped together as a discrete logical combination (i.e. logically in parentheses).

The currentDataProgram class (845) describes a set up for a new sensor data reading, which may be applicable for embodiments that employ query or command system 170 to configure the output data stream of data sources 162 (where data sources 162 comprise sensor networks).

The about trigger class (850) is used to filter all data equal to a user defined value or within 10% of that value. This class also contains CEP-specific terms which are used to generate statements for the CEP server 150.

The area trigger class (855) is used to filter data between two user defined values or thresholds. This class also contains CEP-specific terms which are used to generate statements for the CEP server 150.

The change trigger class (860) is used to filter all data which is different to the previous received data value. This class also contains CEP-specific terms which are used to generate statements for the CEP server 150.

The decrease trigger class (865) is used to recognize if values are decreasing over time (in this case by comparison to the average of the two previous values). This class also contains CEP-specific terms which are used to generate statements for the CEP server 150.

The equal trigger class (870) is used to filter all data which is equal to a user defined value. This class also contains CEP specific terms which are used to generate statements for the CEP server.

The greater trigger class (875) is used to filter all data which is greater than a user defined value or threshold. This class also contains CEP specific terms which are used to generate statements for the CEP server 150.

The increase trigger class (880) is used to recognize if values are increasing over time (in this case by comparison to the average of the two previous values). This class also contains CEP-specific terms which are used to generate statements for the CEP server.

The less trigger class (885) is used to filter all data which is less than a user defined value. This class also contains CEP-specific terms which are used to generate statements for the CEP server 150.

The received trigger class (890) is used to recognize if data from a certain source has been received. This class also contains CEP-specific terms which are used to generate statements for the CEP server 150.

Event definition component 122 comprises event definition user interface 124 to support a user to specify events of interest arising from observations made by various sensors or other data sources. In some embodiments, the event definition user interface 124 may be a plug-in to the open source software ontology editor Protégé 4.1 or another kind of ontology editor 120. In some embodiments, the event definition user interface 124 may comprise the ontology editor 120. The event definition user interface 124 may be domain-independent, relying on the event ontology content 137 to provide the problem context for the user display.

Figure 6A:
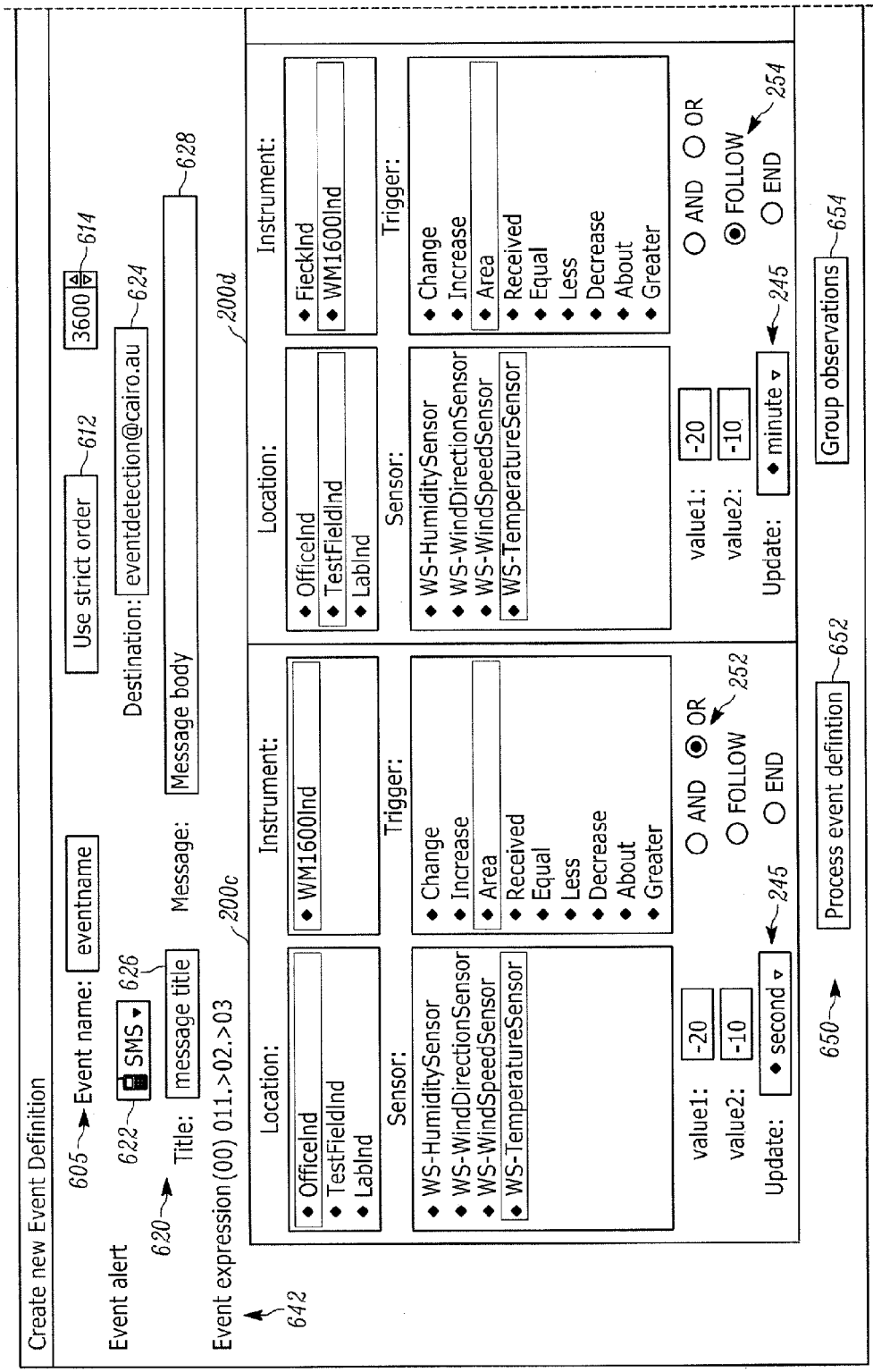
FIGS. 6A and 6B are a further example of user interface display of a combination of user interface elements, the display being provided by an event definition component of the system of FIG. 1.
Figure 6B:
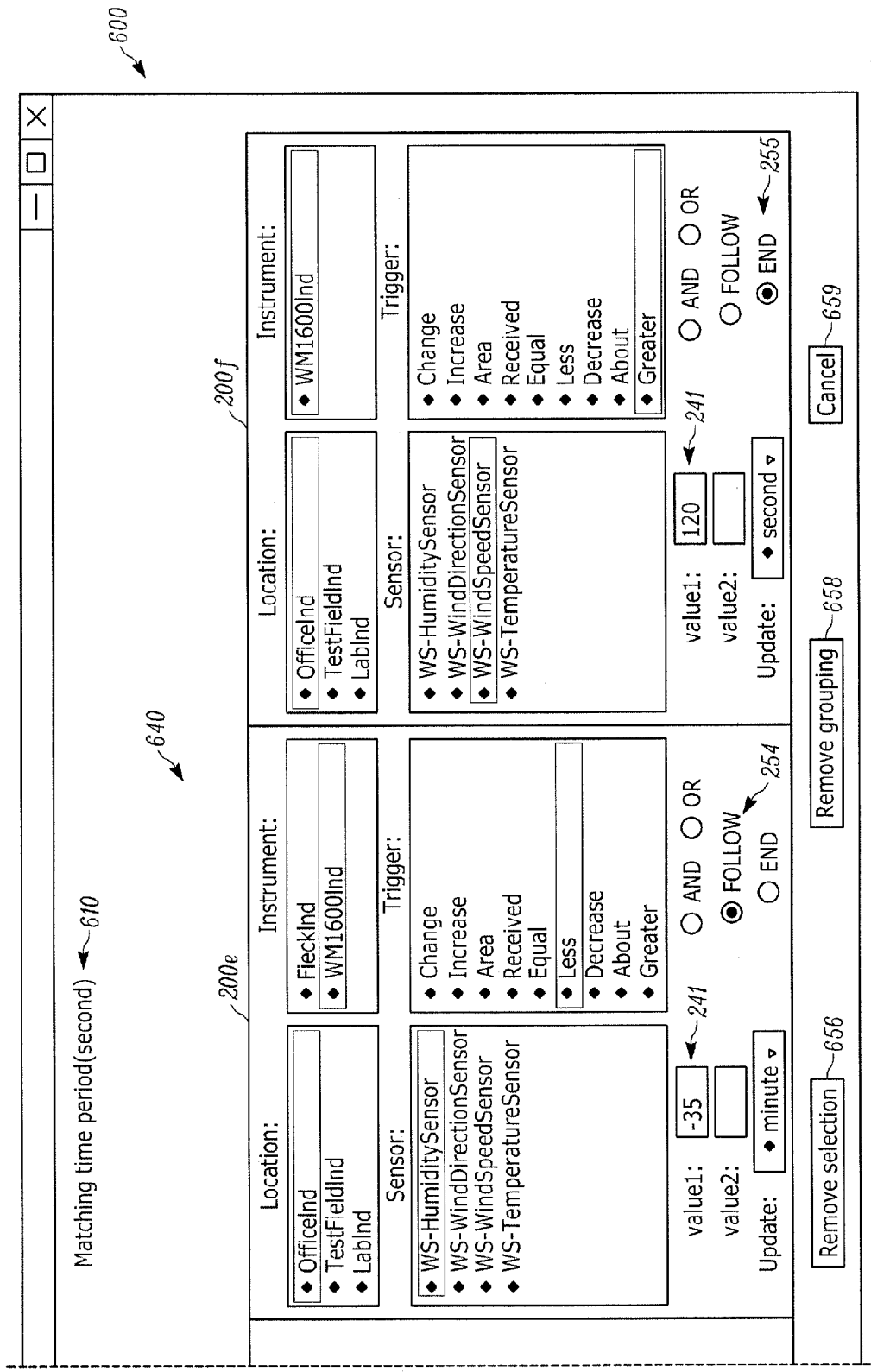

FIGS. 6A and 6B illustrate an example display 600 of the event definition user interface 124, showing an example of a user's specification of an event of interest: in this case a very cold, dry, windy event as a complex correlation of constraints over observed properties of multiple sensor devices.

The event definition user interface 124 constructs the screen display by communicating with a semantic reasoner 139 to retrieve all instances of alerts, instruments, locations, triggers and sensors from the ontology. The display is populated with these objects to form the vocabulary for defining new event descriptions by the user.

When the user selects conditions to define a new event, event definition ontology transformer 126 interprets the user interface input (received from event definition user interface 124) to create a set of ontology instances that corresponds exactly to the event definition. This is forwarded by the event definition component as an ontology (ExportOntology.owl) to the merger component 140.

Figure 2:
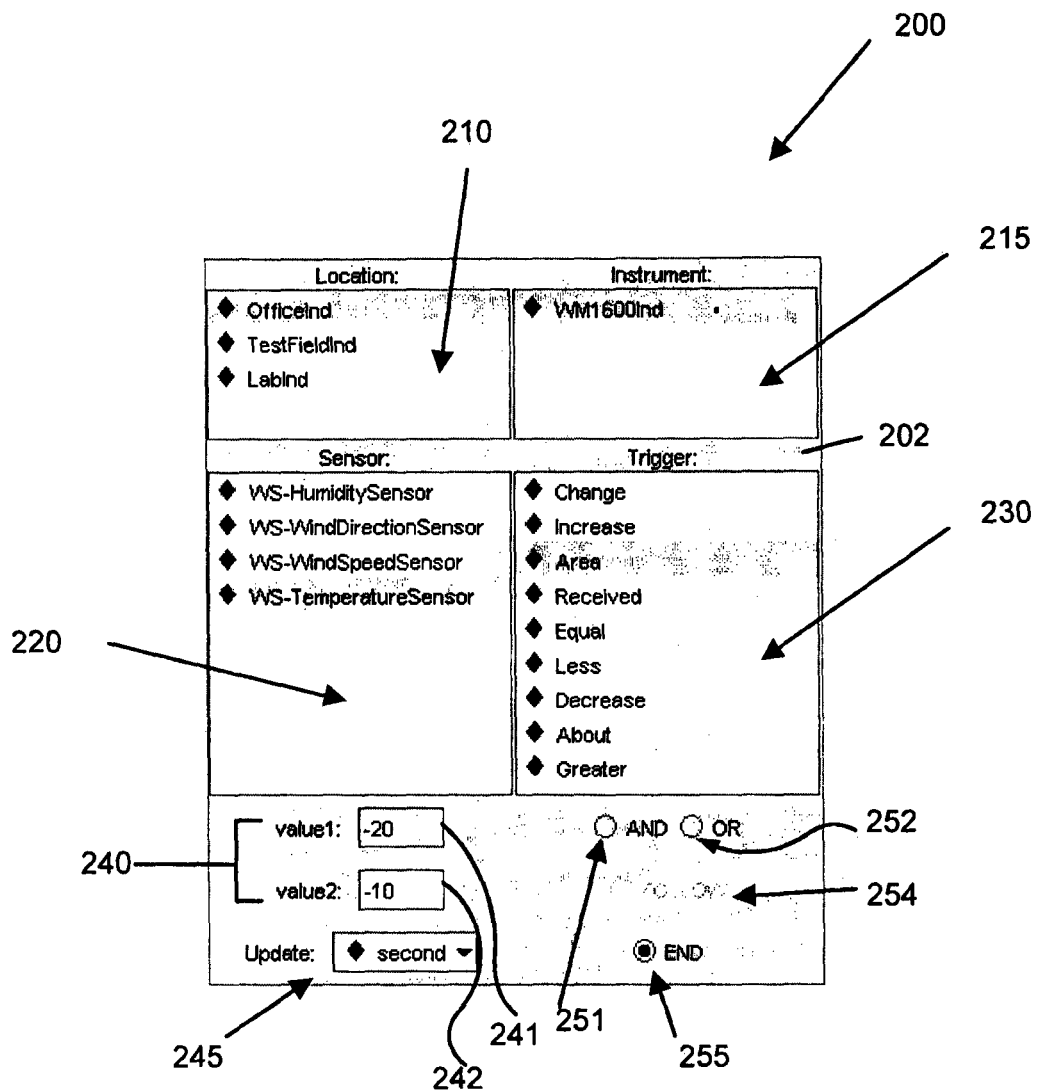
FIG. 2 is an example user interface element for use in defining a complex event.
Figure 3A:
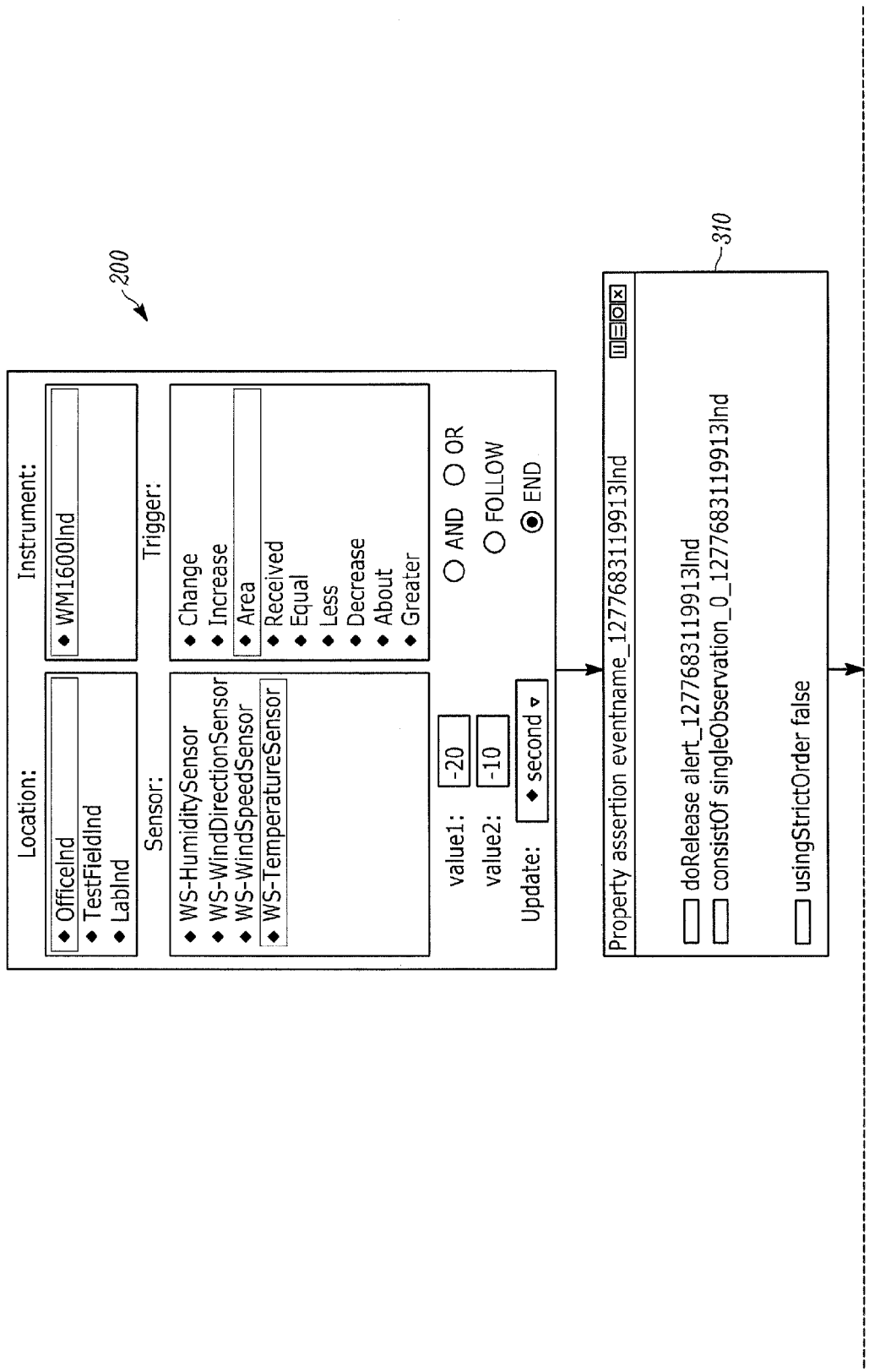
FIGS. 3A and 3B are a schematic illustration of transformation of an event condition represented by the user interface element of FIG. 2 into an ontology-based event definition.
Figure 3B:
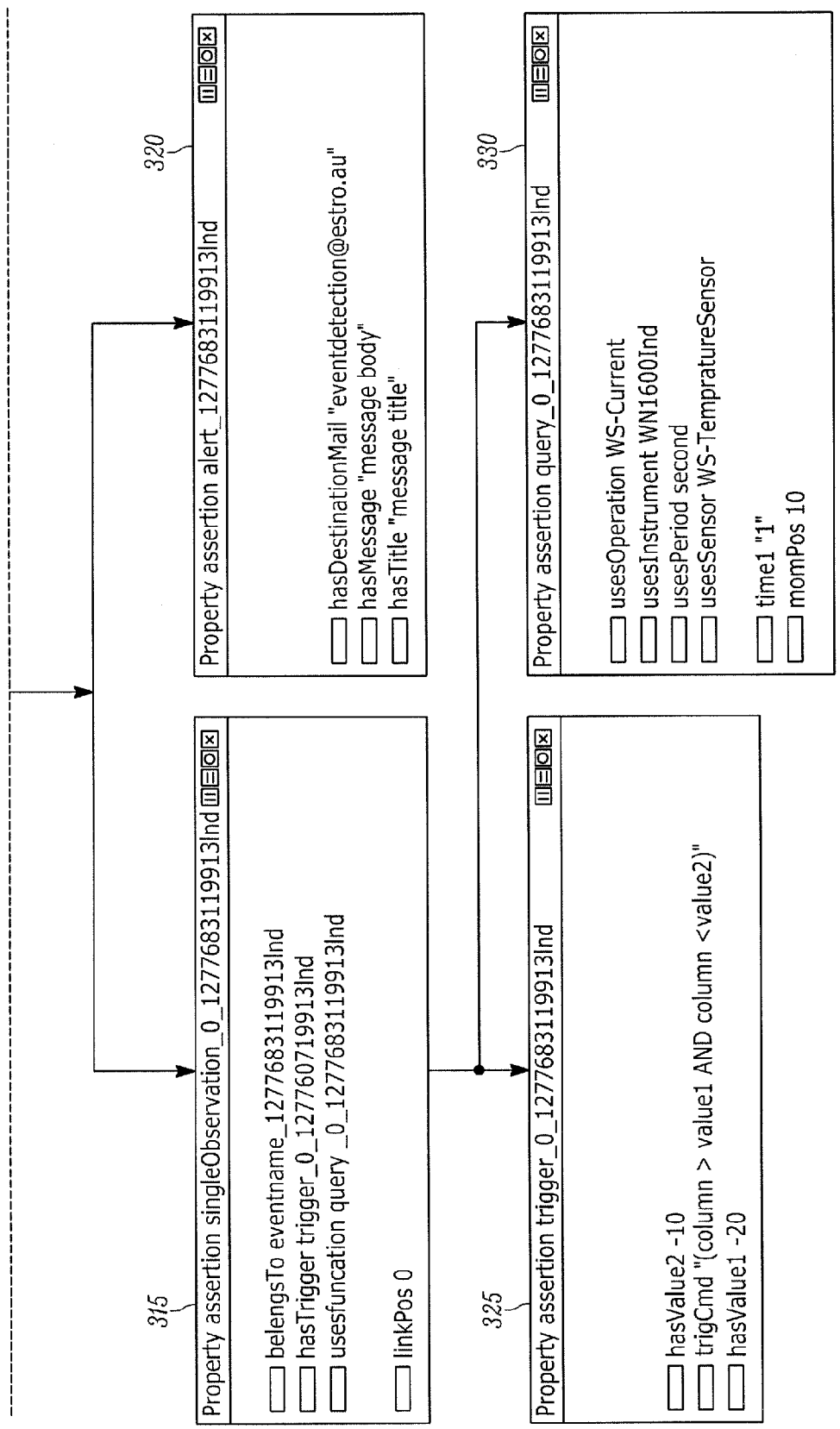

FIG. 2 shows an example user interface element 200 forming part of the user interface display 400 or 600, showing the way the user specifies an event. In the example illustrated in FIG. 2, the user is requesting to be alerted by email when the temperature falls between −20 and −10. The event ontology 137 is updated by the event definition component 122 to reflect this by adding an instance of the event class, "eventname_1277683119913Ind" (FIGS. 3A and 3B), with related instances for object properties and data properties as shown. FIGS. 3A and 3B are a schematic illustration of the ontology-based event definition generated by the event definition ontology transformer 126 based on the event defined by the example user interface element 200.

FIG. 2 illustrates the display populated with Locations, Instruments, Sensors and Triggers from the event ontology 137. In the example displayed, the user has selected one each of these (highlighted), and because the "Area" trigger refers to a range bounded by two values, these are entered by the user in the value fields 241, 242. For other triggers, such as the "About" trigger for example, only one of the input fields 240 needs to receive user input.

The Update field 245 is used in conjunction with query or command system 170 to define the frequency at which the instrument is requested to make sensor readings and to generate the messages from which the defined event is to be detected. However, CEP server 150 is unaffected by the frequency specified in the update field—it simply receives the structured messages when they arrive.

The example user interface element 200 illustrated in FIG. 2 is displayed in the form of a window 202 arranged to allow the user to specify a condition to be met as part of the complex event. Window 202 has selection sub-windows 210, 215, 220 and 230 to allow a user to select location, instrument (or other data provider 160), sensor (or other data source 162) and trigger, respectively, for the event. Depending on the selected location, instrument or sensor, different instruments, sensors or triggers may be displayed in the element sub-windows 215, 220 or 230, for user selection. The location, instrument, sensor and trigger sub-windows 210, 215, 220 and 230 are populated by the event definition user interface 124 in co-operation with reasoner 139 based on the stored event ontology 137.

Each window 202 also allows the specification of a plurality of input values in input fields 240, including a first value 241 and a second value 242, as parameters for the condition to be specified by the user interface element 200.

The AND/OR/FOLLOW/END buttons 251, 252, 254 and 255 are used to form more complex event descriptions. Each user interface element 200 includes logical combination operators 251, 252 for "AND" and "OR" logical combinations. Additionally, a temporal combination operator 254 (e.g "FOLLOW") can be selected to specify that the condition being expressed in user interface element 200 is to temporally succeed a previous specified condition of the event definition. For the last user interface element 200 in a concatenated series of user interface elements 200, the user selects an END operator 255.

Referring in particular to FIGS. 3A and 3B, the example user interface element 200 shown in FIG. 2 is illustrated with reference to the ontology-based event definition elements 310 to 330 that are generated by event definition ontology transformer 126 based on the condition expressed in user interface element 200. For example, an event class 310 is created that includes an alert 320 and a single observation 315. The single observation 315 has an area trigger 325 (defined as a temperature between −10 and −20 degrees) and a query 330 to be directed to data source 162 (for embodiments that combine query or command system 170 within system 100). The ontology elements 310 to 330 in FIGS. 3A and 3B correspond to selected elements of the ontology elements described in relation to FIGS. 8A to 8C.

Figure 4:
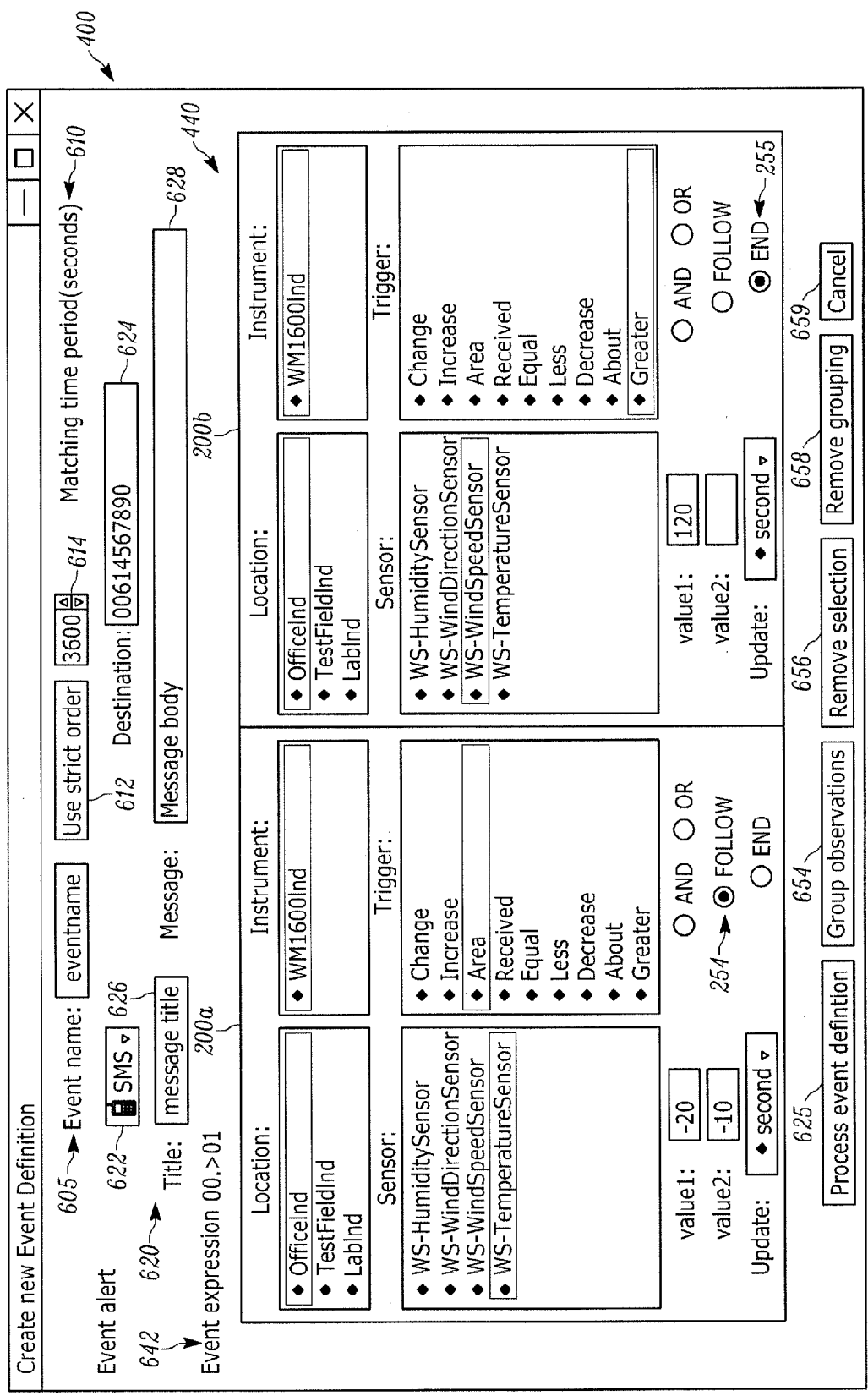
FIG. 4 is an example user interface display of a combination of user interface elements for use in defining a complex event.

FIG. 4 shows an example display 400 of a combination 440 of user interface elements 200a and 200b to define a complex event that occurs when a temperature is measured in the range −20 to −10 and this is followed within 1 hour by a wind speed in excess of 120. The occurrence of the event is notified by an SMS.

Display 400 illustrates an example user interface provided by event definition user interface 124 to enable the user to provide input to define a complex event of interest. Display 400 allows the input of an event name 605, together with temporal conditions 610, including a selection button 612 to use a strict temporal order of conditions (single events) and a time window 614 within which the conditions or events must occur in order to satisfy all conditions of the complex event. Display 400 also allows input of alert information 620, including for example an alert type 622, which may be an email alert or an SMS alert, a message title 626 (for email), a message body 628 and an alert destination 624.

The user interface element combination 440 is displayed prominently and centrally within display 400, primarily as a graphical concatenation of user interface elements 200 combined according to their logical and/or temporal combination operators. In the example of combination 440, temporal combination operator 254 is selected to cause the complex event to only occur when the event specified in user interface element 200a is followed by the event specified in user interface element 200b with the time period set in field 614 (i.e. one hour). The end operator 255 specified in user interface element 200b indicates that that element is the last element in the combination. If the user elected to add a further event component to the complex event definition, one of the logical combination operators 251, 252 and 254 can be selected, in which case event definition user interface 124 will cause a further user interface element 200 to be displayed adjacent user interface element 200b.

Figure 5A:
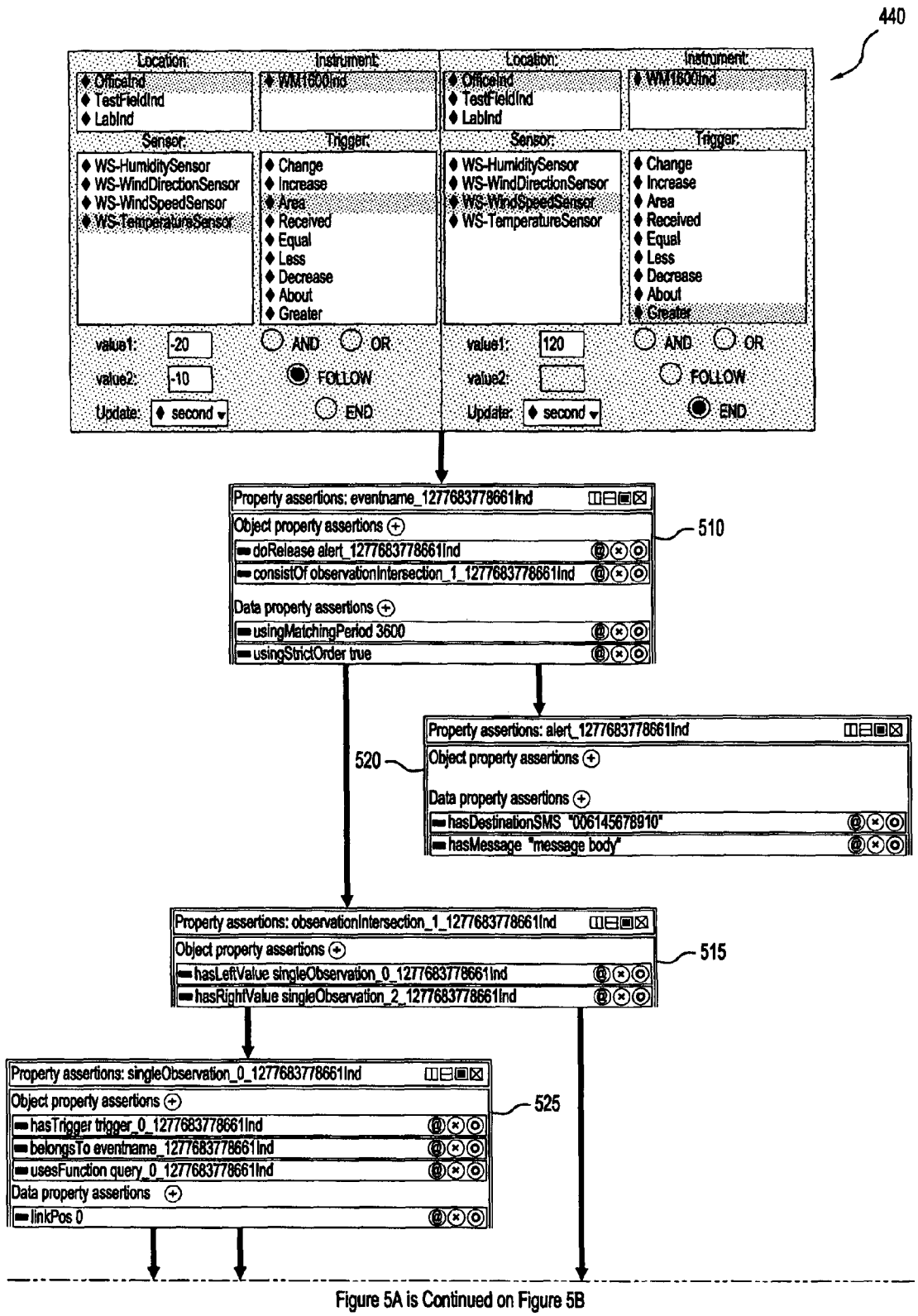
FIG. 5 is a schematic illustration of transformation of event conditions represented by the combination of user interface elements of FIG. 4 into an ontology-based event definition.
Figure 5B:
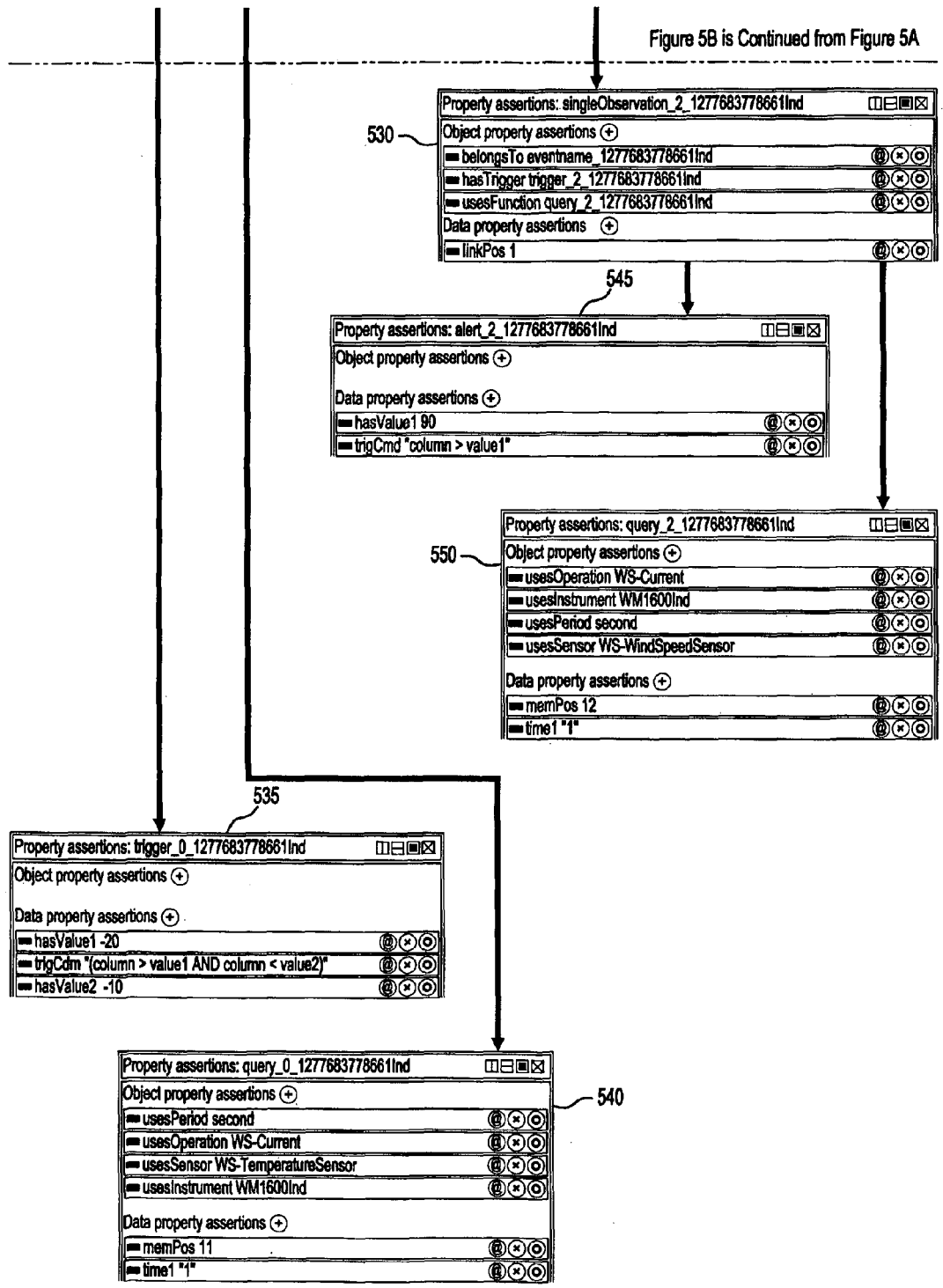

Once the user has created a satisfactory event definition by appropriately arranging and selecting location, instrument, sensor, trigger, applicable trigger values and logical/temporal combination operators as appropriate, user selection of a process event definition button 652 will cause event definition user interface 124 to pass the user defined event definition to event definition ontology transformer 126 for processing, as illustrated in FIG. 5.

As is shown in FIGS. 4 and 6, display 400 or 600 may include an event expression 642 that illustrates the combination of user interface elements by a logical expression notation.

In some instances, it may be desirable to group user interface elements together as a complex event within a larger event definition, in which case the user may select a "group observations" button 654. Grouped observations are displayed in the event expression 642 as being within parentheses. This grouping can be removed by selection of "remove grouping" button 658. Where desired, a user interface element 200 can be deleted from the display by selection of remove selection button 656. The entire event definition display 400 or 600 can be cancelled by selection of cancel button 659.

FIG. 5 is a schematic illustration of the ontology-based event definition generated by the event definition ontology transformer 126 based on the event defined by interface element combination 440 of FIG. 4.

As illustrated in FIG. 5, the complex event specified by user interface element combination 440 is processed by event definition ontology transformer 126 to generate ontology elements 510 to 550 that form an ontology based event definition of the complex event. Ontology element 510 defines an event that has an alert instance 520 and an observation intersection instance 515 and temporal matching conditions. Observation intersection element 515 defines single observation instances 525 and 530, each of which has a respective trigger instance 535, 545 and an update period definition in the form of a query to be provided to data sources 162 (if query or command system 170 is present).

FIGS. 6A and 6B show a further example display 600 of a combination 640 of user interface elements 200*c*, 200*d*, 200*e* and 200*f*, each of which defines an observation condition or single event and a logical or temporal combination operator (i.e. AND/OR/FOLLOW/END). In the example combination 640, user interface elements 200*c* and 200*f* use different data sources at different locations and, in some case, use different sensors (i.e. data source types) and triggers to those of user interface elements 200*d* and 200*e*. Those different data sources independently produce observational data streams that are: 1) separately fed into (and expected to be received by) the CEP server 150 according to some parts of the event processing instructions generated according to techniques described herein; and 2) jointly monitored and related to detect the combined (complex) events as specified by this user interface. This is achieved by other parts of event processing instructions transmitted to the CEP server 150.

FIG. 9 shows an example of event processing instructions to be provided by ontology-CEP transformer 144 to CEP server 150 to configure itself according to the event definition specified in the user interface screen of display 600. The event processing instructions 900 are generated based on the ontology-based event definition transmitted from event definition ontology transformer 126 to ontology merger 142, which updates the event ontology 137 with instances extracted from the ontology based event definition and then passes that to the ontology-CEP transformer 144 to generate the event definition instructions.

The ontology merger module 142 of transformer component 140 extends the previously stored event ontology 137 to incorporate the ontology-based event definition arising from the new event specification. The newly merged event ontology 137 is used by the ontology-CEP transformer 144 module to generate configuration data for the CEP server.

The ontology-CEP transformer 144 extracts instances of data properties and object properties from the event ontology 137 which are needed for the configuration data. Instances describe the alert message destination, event description, and primitives from the CEP language. For example, 865 in FIG. 8B gives a trigCmd (trigger) data property value to be "instrument-column<(SELECT AVG . . . )". Such primitives include the CEP language primitives that are used to combine the representations of events over separate observation data streams into complex event descriptions (usually) that incorporate temporal relationships between individual events. Using these, plus an internal model of the CEP language structure and the ontology structure, the ontology-CEP transformer 144 generates event processing instruction configuration data representing the event specification in a form directly recognised by the CEP server 150.

Class and instance names from the merged event ontology 137 are used to name the variables of the target (EPL) configuration language. This, together with the instance data about the structure and configuration of the sensor systems (or other data sources) and the CEP configuration language, allows the automated generation by the ontology-CEP transformer 144 of the CEP configuration code that is to be sent to the CEP server 150. The ontology-CEP transformer 144 comprises program code written to generate configuration instructions specifically formatted to be readily parsed and executed by the chosen CEP server 150.

A good example to illustrate the EPL variable naming, along with the usage of fragments of the language, is the trigger generation. For example, statement 910 within FIG. 9 has been automatically generated by ontology-CEP transformer 144 with information from the event ontology 137. Statement 910 is a trigger which looks for received data between the user defined thresholds of −20 and −10. The trigger class within the ontology provides the following default statement for this filter: "(column>value1 AND column<value2)". This statement contains several placeholders which have to be replaced with values by the Ontology-CEP transformer 144 to be a valid CEP statement. The "value1" and "value2" terms are replaced with concrete values (in this case −20 and −10), which were stored as instance data within the event ontology 137 through the event definition component 122 when entered by the user through event definition user interface 124. The "column" placeholder is replaced by variable names derived from sensor and instrument names used within the event ontology 137.

CEP configuration further involves the transformer component 140 providing (within the event processing instructions) to the CEP server 150 a definition of the data stream: the source structure, attributes and frequency of data messages arriving from sensor devices.

Figure 11:
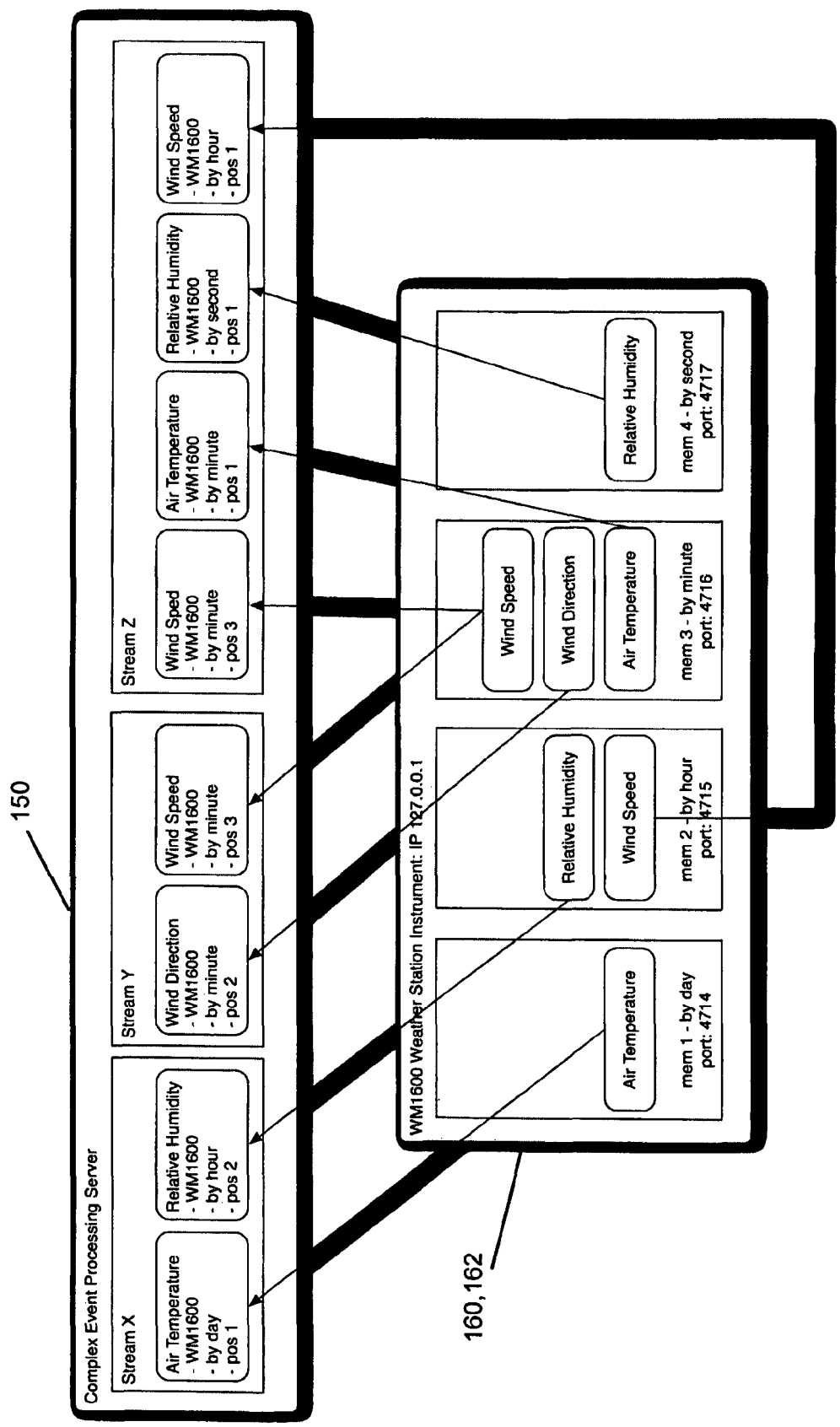
FIG. 11 is a schematic block diagram illustrating receipt of data streams at a CEP server.

In some applications, a weather station may be used as a data source 162 or data provider 160 (if individual sensors on the station are the data sources 162). The weather station instrument may provide four memories (on separate ports) to store the daily, hourly, minute-by-minute and the second-by-second measured data, for example. Each memory can be streamed independently to the CEP server 150. To access a certain value within the (comma separated value) data stream, it is important to know which data column contains the relevant data. For this reason the query or command system 170 can be used for a new sensor reading to return the position of the program within the weather station memory. This information is stored within the ontology whenever a new weather station program is issued. Using the program position, together with a ontological description of the sensor program, which contains the network connection instruments and the update interval of the used sensor (second, minute, hour), it is possible to access the correct memory and filter the right column. An illustration of this concept is shown in FIG. 11. This described approach is very particular to the architecture of the weather station. A more common architecture (say for finance data) would have the incoming messages in some fixed (say tabular) format and the location of each desired attribute in the message would be encoded in the event ontology. The 'column' name, probably a text string to be inserted in the CEP configuration code, would be associated with the observed property (e.g stock bid price) for the instrument or data source.

The ontology-CEP transformer 144 invokes a general purpose OWL2 semantic reasoner 139 to classify the ontology-based event definition in the context of streams defined in the merged ontology arising from previously running event definitions. If the new event definition stream is subsumed by a pre-existing stream, then the pre-existing stream is reused in the new CEP configuration, rather than creating a new CEP stream. This improves the efficiency of the CEP at run-time because fewer streams need to be defined and processed by the CEP server 150. The subsumption test executed by the semantic reasoner 139 recognises when an earlier stream arising from the desired sensor device and measuring at least the desired attributes, and at least the desired frequency, is already configured as an input stream for the CEP server 150.

FIG. 9 shows an example of the generated CEP configuration instructions for the previous complex query example display 600 illustrated in FIGS. 6A and 6B. Data extracted from the merged ontology 137 are highlighted.

The ontology-CEP transformer 144, or a separate compiler/configuration module (not shown) of the transformer component 140, passes the new event processing instructions, including configuration data (compiled by CEP-associated tools, if required), to the running CEP Server 150. The CEP server 150 then executes the configuration data to cause itself to observe structured messages in one or more specified streams (data sources) and generate and send alert or control messages to an external destination address (specified in the configuration data). Such alert or control messages may include, for example and without limitation, an email alert 152, a short messaging service (SMS) alert 154 and/or an infrastructure control message 156.

Described embodiments may be combined in a single system with the system and method described in International Patent Application No. PCT/AU2009/000799 (Publication No.: WO/2010/148419), "METHOD AND SYSTEM FOR ONTOLOGY-DRIVEN QUERYING AND PROGRAMMING OF SENSORS" and the entire contents of which is hereby incorporated by reference. Such a combined system enables an integrated environment for both programming heterogeneous sensor networks (individually) to produce observation data and to specify and search for real-time events of interest over the joint observational data.

Figure 7A:
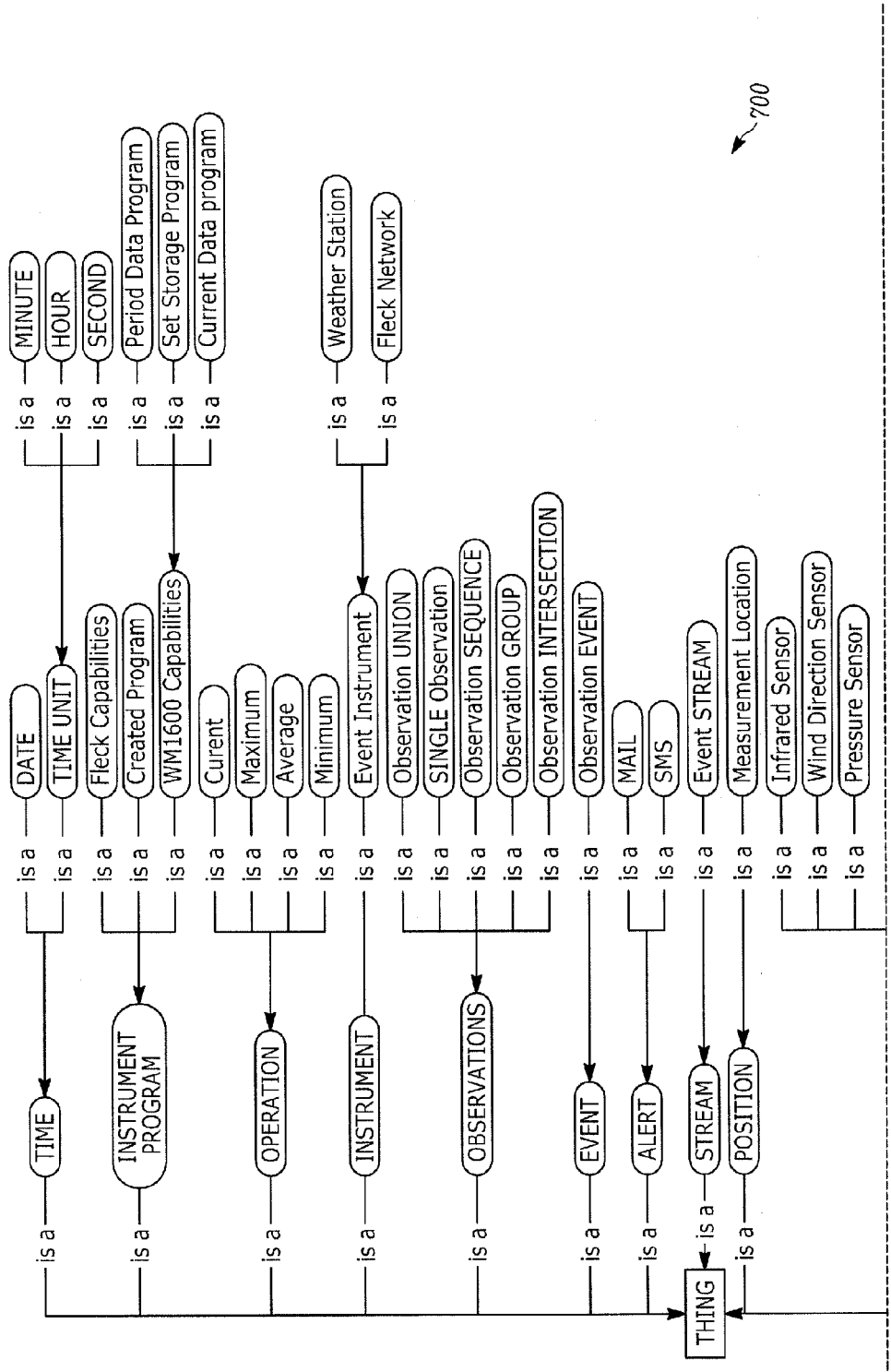
FIGS. 7A and 7B are an example event ontology, showing only the classes of the ontology.
Figure 7B:
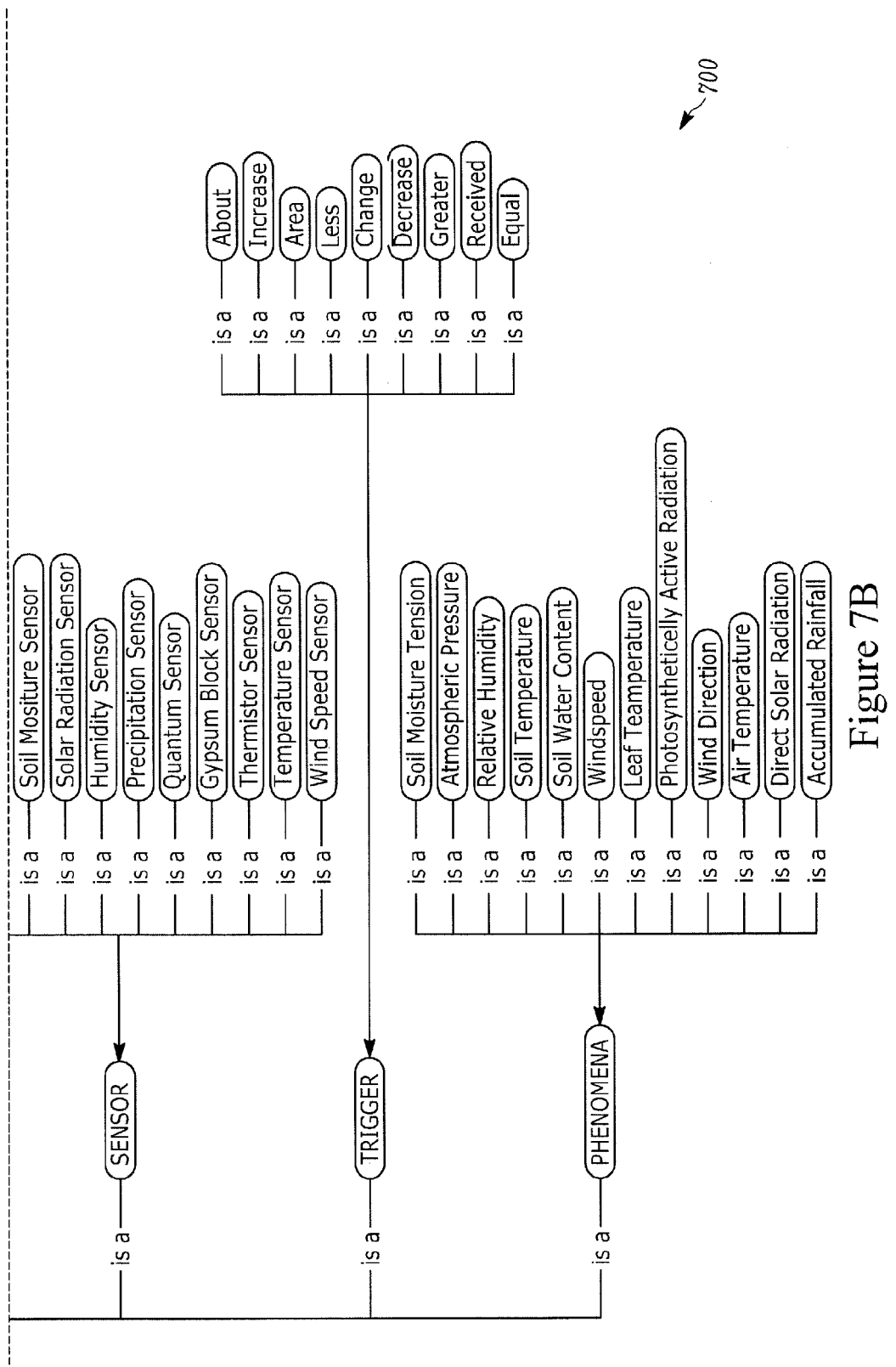

Such a combined system extends the event definition user interface 124 described here to incorporate the querying and programming functions of the user interface in PCT/AU2009/000799. Thus, query or command system 170 may comprise an ontology transformer in communication with an ontology editor (such as ontology editor 120), an ontology server, a formal reasoner (such as reasoner 139) and a gateway or node (such as data providers 160) to carry out such functions. When an event is specified (as described herein), each condition of that event description needs to correspond to a data stream that generates the relevant observations. Firstly, for each condition, a corresponding program is created as an ontology class definition in the "Instrument Program" class (see FIGS. 7A and 7B showing the event ontology) as described in PCT/AU2009/000799. Then the semantic reasoner 139 is used to check whether any of those classes are semantically equivalent to a program concept already defined in the event ontology 137. If so, the existence of that equivalent program concept indicates a running sensor device program that is already delivering the relevant observational data for the condition to the CEP server 150, so no fresh program is required to be transmitted to the sensor device. Otherwise, if no equivalent program is found, the query or command component 170 (representing the functions of the query/programming system and method of PCT/AU2009/000799) can be used to program the sensor device accordingly.

Figure 10:
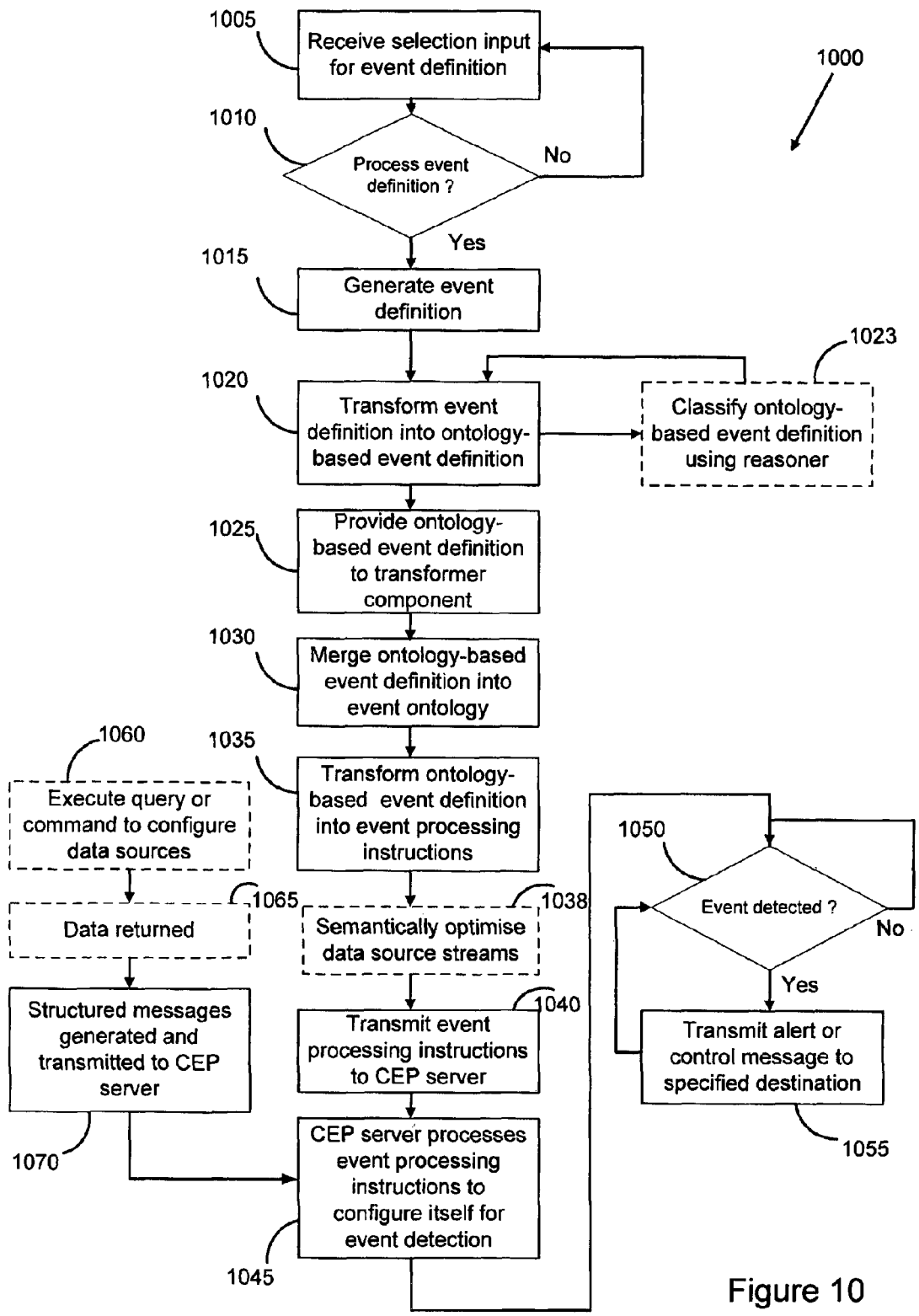
FIG. 10 is a flowchart of a method of ontology-driven complex event processing.

Referring also to FIG. 10, a method 1000 or ontology-driven complex event processing using system 100 is described in further detail. Method 1000 begins at 1005, where the computing device 105 is operated by the user to execute ontology editor 120 in combination with event definition component 122 and to provide user input into a displayed interface, such as is exemplified in FIGS. 4 and 6, generated by event definition user interface 124.

Event definition user interface 124 performs 1005 until the user selects the process event definition button 652 at 1010 (or cancels the creation of an event definition). Once the process event definition button 652 is selected, the event definition user interface 124 processes the received user input at 1015 to check that every necessary part of the input has been entered by the user. The event definition user interface 124 creates a representation of the user input in user interface object structures comprising lists, sets, strings, integers and Boolean terms and provides that representation to the event definition ontology transformer 126 to transform the event definition into an ontology-based event definition at 1020. The event definition ontology transformer 126 uses the user interface data including the class and individual names as selected and the values as entered by the user through the user interface to create new classes and individuals that describe the user interface combinations in the form of event ontology instances and classes.

Optionally at 1023, the ontology-based event definition is provided by event definition ontology transformer 126 to the semantic reasoner 139 to semantically optimise it by classifying it within the event ontology 137. If the classification reveals that any of the new "currentDataProgram" class instances are members of more than one "currentDataProgram" classes, then one of those pre-existing classes can be used instead of the newly created class and instance arising from this event definition (and the newly created class and instance can then be discarded). The classified and optimised ontology-based event definition is then further transformed as necessary at 1020 and provided to transformer component 140 at 1025, either by transmission over network interface 130 or local passing of control, depending on whether transformer component 140 is remote or local to computing device 105.

Ontology merger 142 then merges the ontology based event definition into the event ontology 137 at 1030. This merge can be properly done in a number of ways. Described embodiments have invoked the Protégé 6 API function called "mergeOntologies", for example.

At 1035, the ontology-CEP transformer 144 transforms the ontology-based event definition into event processing instructions executable by CEP server 150. Optionally, the event processing instructions are passed to reasoner 139 at 1038 to classify the event processing instructions based on previously running data source streams and thereby optimise the event processing instructions in relation to the data source streams.

At 1040, the event processing instructions (optionally optimised at 1038) are transmitted by ontology-CEP transformer 144 to CEP server 150, having been written by ontology-CEP transformer 144 in a form readily parseable and executable by CEP server 150. The network location of CEP server 150 is passed to ontology-CEP transformer 144 as part of the ontology based event definition received from event definition ontology transformer 126 (where the network location of the CEP server 150 is known locally or accessible to ontology editor 120 and/or event definition component 122). Similarly, where transformer component 140 is executing on a computing device other than computing device 105, its network location is known locally or accessible to ontology editor 120 and/or event definition component 122.

At 1045, CEP server 150 executes the event processing instructions, thereby configuring itself to observe and process incoming structured messages from the specified data sources. The thus configured CEP server 150 determines at 1050 whether all of the conditions specified in the event processing instructions are satisfied by the data contained in the received structured messages and, if so, determines that the complex event has occurred. The CEP server 150 then looks up the specified event alert type 622 and event destination 624 (stored locally on, or otherwise accessible to, the CEP server 150 as part of the configuration process), and at 1055 generates and transmits over the network interface 130 an alert message 152, 154 of the specified event alert type 622 (e.g. SMS or email) and having the specified destination address, message body 628 and optionally message title (for emails). Where the SMS alert 152 is specified, the network interface needs to have access to a wireless telephony network or means to translate the telephone number to another network location. In some embodiments, the event alert may comprise a control message to be sent to a specified network location as part of an automated control procedure.

The CEP server 150 continue (until configured otherwise) to monitor the received data streams at 1050 to determine whether all of the conditions specified in the event processing instructions are again satisfied by the data contained in the received structured messages and, if so, again transmit an alert at 1055.

Some embodiments involve the execution of a query or command at 1060 to configure the data sources 162 to provide the desired data streams to CEP server 150 over the network interface 130. This configuration of data sources 162 may be performed prior to the provision of the event processing instructions to CEP server 150 at 1040 using query or command system 170 as described herein and as described in PCT/AU2009/000799. The data returned at 1060 may optionally be provided at 1065 to data providers 160 for structuring and formatting and subsequent transmission at 1070 to CEP server 150. Alternatively, the query or command at 1060 may configure the data sources 162 to communicate structured messages at 1070 directly to CEP server 150 instead of via data providers 160.

Some embodiments may be employed in the domain of agricultural research. In such embodiments, the sensors involved may include weather stations and Fleck ("Fleck—a platform for real-world outdoor sensor networks", Sikka, P., et al., IPSN/SPOTS '07 Cambridge Mass., the disclosure of which is incorporated herein by reference) or Mote wireless sensor networks with sensors measuring soil temperature, leaf temperature, solar radiation, soil moisture, air pressure, wind direction, wind speed and humidity located around an experimental or commercially used agricultural field plot.

Such embodiments may be configured to support alerts (output messages) as emails or SMS messages, or to send messages to directly control the behaviour of infrastructure in the field. For example, a user could use system 100 and method 1000 to turn on sprinklers when certain soil moisture and wind conditions are detected, or to move portable greenhouses into position to protect plants when a frost is occurring, where a frost may be defined as a complex correlation of observed measurements over time. The system 100 and method 1000 allow the users to conveniently change their specification of behaviours according to their developing knowledge of the environmental conditions and in accord with the nature of the experiments being performed or crops being cultivated.

Some embodiments of system 100 and method 1000 may be employed in financial market contexts. CEP systems can be used in the finance industry to detect events occurring over streams of finance data such as the market prices of financial instruments (stocks, bonds, options, derivatives, etc).

Embodiments of system 100 and method 1000 may be applied to the detection of complex financial events by developing an appropriate domain ontology that models financial data, events, and triggers (the "event ontology"), and initially configuring the CEP to receive data from the relevant data sources. The system 100 and method 1000 then applies directly to this domain, although there may be a preference to develop another user interface to more specifically meet the needs of users in the relevant financial markets. The extension to supporting programming of sensors may not apply in this case—as there may not be a corresponding mechanism to programmatically change the data feeds. The application of system 100 and method 1000 in this domain would enable finance industry staff to directly describe and rapidly change their specifications of "interesting" market conditions without reference to software support staff, in a contextualised way that is supported by a knowledge-rich specialist domain ontology.

Embodiments of system 100 and method 1000 may also be applied to the detection of security breaches in airports or other physical installations, such as buildings, factories and warehouses, where the data sources may represent, for example, access to secure locations, security violations, baggage screening detections, observations arising from portable devices and hazard occurrences.

Embodiments of system 100 and method 1000 may also be applied to the detection of adverse events in supply chain management, where the data sources may represent, for example, placement of customer orders, updates to track-and-trace data, reception of goods at a warehouse, and dispatch of goods.

Embodiments of system 100 and method 1000 may also be applied to fraud monitoring of computer servers and networks for banking, government or other purposes, where the data sources might represent, for example, selected network packet arrivals, user login events, authentication events, and electronic financial transactions.

Embodiments of system 100 and method 1000 may also be applied to the detection of manufacturing failures, where the data sources might be, for example, messages from production line equipment, data arising from environmental sensors and human quality control notifications.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

The invention claimed is:

1. A system for ontology-driven complex event processing (CEP), comprising:
   a computer in communication with a network, the computer having access to program code executable to enable user generation of an event definition comprising at least one condition and to transform the event definition into an ontology-based event definition; and
   a computer-implemented transformer component to receive the ontology-based event definition, generate event processing instructions based on the ontology-based event definition and transmit the event processing instructions to a CEP server over the network, wherein the event processing instructions are executable by the CEP server to configure the CEP server to:

observe a plurality of structured messages containing event data from at least one data source and to determine whether the event data satisfy all conditions of the event definition, and send an event message to an entity specified in the event definition responsive to determining that all event definition conditions are satisfied.

2. The system of claim 1, wherein the transformer component is in communication with the computer over the network.

3. The system of claim 1, wherein the transformer component is executed by the computer.

4. The system of claim 1, further comprising the CEP server configured according to the event processing instructions.

5. The system of claim 1, wherein the transformer component is configured to communicate with a semantic reasoner to classify generated event processing instructions.

6. The system of claim 1, wherein the program code comprises code to execute an ontology editor application and wherein the ontology editor application has access to a stored event ontology to support user generation of the event definition.

7. The system of claim 6, wherein the program code comprises code to execute a user interface component in cooperation with the ontology editor application to allow user selection of the entity, the at least one condition and content of the event message when generating the event definition.

8. The system of claim 7, wherein the user interface component includes code to display each condition as a discrete configurable user interface element.

9. The system of claim 8, wherein the user interface component includes code to allow combination of multiple conditions as a concatenation of user interface elements.

10. The system of claim 9, wherein each user interface element allows selection of a logical combination operator to be applied to at least one other concatenated user interface element.

11. The system of claim 9, wherein each user interface element allows selection of a temporal combination operator to be applied to at least one other concatenated user interface element.

12. The system of claim 7, wherein the user interface component is configured to allow selection of a single data source for each condition, the selection being from among a plurality of data sources.

13. The system of claim 7, wherein the user interface component is configured to allow user selection of a time window for the satisfaction of the conditions as part of the event definition.

14. The system of claim 6, wherein at least one of the ontology editor application and the user interface component is configured to create a set of ontology instances in the event ontology that correspond to the event definition.

15. The system of claim 1, wherein each condition includes an event trigger selected from among a plurality of triggers.

16. The system of claim 1, wherein the at least one data source comprises a plurality of different types of data sources.

17. The system of claim 1, further comprising a query/command component to configure the at least one data source to generate at least one data stream for receipt and processing by the CEP server according to the event processing instructions.

18. The system of claim 1, further comprising a semantic reasoner to receive and classify the ontology-based event definition, wherein the program code further comprises code to modify the ontology-based event definition depending on the classification by the semantic reasoner.

19. A method of ontology-driven complex event processing (CEP), comprising:

receiving via a computer interface an event definition of a complex event, the computer interface executing on a computer and the event definition comprising at least one condition;

accessing a stored event ontology accessible to the computer;

transforming the event definition into an ontology-based event definition based on the event ontology;

receiving at a computer-implemented transformer component the ontology-based event definition;

generating by the transformer component event processing instructions based on the ontology-based event definition; and transmitting the event processing instructions to a CEP server over a network, wherein the event processing instructions are executable by the CEP server to configure the CEP server to:

observe a plurality of structured messages containing event data from at least one data source and to determine whether the event data satisfy all conditions of the event definition, and send an event message to an entity specified in the event definition responsive to determining that all event definition conditions are satisfied.

20. The method of claim 19, wherein the event definition is received by a user interface component cooperating with an ontology editor application, both of which are executed by the computer, the user interface component allowing user selection of the entity, the at least one condition and content of the event message when receiving the event definition.

21. The method of claim 20, further comprising the user interface component displaying each condition as a discrete configurable user interface element.

22. The method of claim 21, further comprising the user interface component allowing combination of multiple conditions as a concatenation of user interface elements.

23. The method of claim 21, further comprising the user interface component allowing selection of a logical combination operator to be applied to at least one other concatenated user interface element.

24. The method of claim 22, further comprising the user interface component allowing selection of a temporal combination operator to be applied to at least one other concatenated user interface element.

25. The method of claim 20, further comprising the user interface component allowing selection of a single data source for each condition from among a plurality of data sources.

26. The method of claim 20, further comprising the user interface component allowing selection of a time window for the satisfaction of the conditions as part of the event definition.

27. The method of claim 20, further comprising at least one of the ontology editor application and the user interface component creating a set of ontology instances in the event ontology that correspond to the event definition.

28. The method of claim 19, wherein each condition includes an event trigger selected from among a plurality of triggers.

29. The method of claim 19, wherein the at least one data source comprises a plurality of different types of data sources.

30. The method of claim 19, further comprising configuring the at least one data source to generate at least one data stream for receipt and processing by the CEP server according to the event processing instructions.

31. The method of claim 30, wherein the configuring is performed prior to the transmitting.

32. The method of claim 19, further comprising: using a semantic reasoner to classify at least one of the ontology-based event definition and the event processing instructions; and modifying the ontology-based event definition and/or the event processing instructions depending on the classification.

33. A system for complex event processing (CEP), comprising:
- a computer-implemented interface to receive event definition input comprising at least one condition and to receive data source configuration input;
- a transformer component in communication with the interface to generate event processing instructions based on the event definition input and send the event processing instructions to a CEP server, wherein the event processing instructions are executable by the CEP server to configure the CEP server to:
  - observe a plurality of structured messages containing event data from at least one data source and to determine whether the event data satisfy all conditions of the event definition, and
  - send an event message to an entity specified in the event definition responsive to determining that all event definition conditions are satisfied; and
- wherein the interface and transformer component cooperate to generate and send configuration instructions to configure the at least one data source to transmit the structures messages to the CEP server.

34. A computer-readable storage medium having stored thereon executable program instructions to perform the method of claim 19.

* * * * *